UNITED STATES PATENT OFFICE.

CHARLES GOODYEAR, OF NEW HAVEN, CONNECTICUT, EXECUTOR OF CHAS. GOODYEAR, DECEASED.

IMPROVEMENT IN THE ART OF PREPARING CAOUTCHOUC.

Specification forming part of Letters Patent No. 3,633, dated June 15, 1841; extended seven years; Reissue No. 156, dated December 25, 1849; Reissue No. 1,085, dated November 20, 1860.

DIVISION B.

*To all whom it may concern:*

Be it known that CHARLES GOODYEAR, late of the city of New Haven, in the State of Connecticut, did invent a certain new and useful Improvement in the Manner of Preparing Fabrics of Caoutchouc or India-Rubber, not known or used by others before his invention or discovery; and I do hereby declare that the following is a clear and exact description of the principle or character which distinguishes it from all other things known before.

The object of this invention is the production of the new manufacture, substance, or product known as "vulcanized india-rubber," (which is also the invention of said CHARLES GOODYEAR, and the subject of another patent bearing even date herewith,) and its peculiarity is in the art or process by which that manufacture or substance is produced. That art or process is conducted as follows:

Native caoutchouc or india-rubber is combined with sulphur, which may be done in various ways well known to the trade before the date of this invention, the most common of which is either by grinding the dry rubber and sulphur together in a machine with heated cylinders, well known for that purpose, until the mixture is reduced to a plastic state, or by dissolving the caoutchouc or india-rubber in its known solvents, the one most commonly used being camphene or spirits of turpentine, and adding to the solution the sulphur in a powdered state. The proportions of the gum and sulphur which are found good in practice are twenty-five parts of india-rubber and five parts of sulphur, by weight, although vulcanization will be produced by using sulphur in various proportions considerably less or more than these. To this mixture other ingredients may be added, among which white lead is one of the best, and which, when combined with the rubber and sulphur in the proportion of seven parts, by weight, materially facilitates the process.

The mixture of india-rubber with sulphur and with other materials was well known before the date of this invention; but no result of any great value was thereby produced until CHARLES GOODYEAR discovered his new art or process, by which an entire change is effected in the properties and qualities of the mixture of india-rubber and sulphur, rendering the substance or material highly and permanently elastic under all conditions of its use, and insensible to heat and cold, and in some measure to the destructive effects of many of the essential oils and acids.

This art or process consists in subjecting caoutchouc or india-rubber, when combined with or in the presence of sulphur, to the action of a high degree of heat, for the purpose of changing or altering its qualities and properties and producing the new substance called "vulcanized india-rubber;" and it may be carried on in a variety of ways, the effect being due to the action of heat, without regard to the particular manner of its application. One of the methods is to place the composition of rubber and sulphur in an oven, and then to heat it up gradually until it attains the temperature necessary to produce the change required, which will be, say, from 212° to 350° Fahrenheit, according to the quantity of sulphur, the size of the mass to be operated upon, the degrees of temperature applied, and the presence of other ingredients in the composition. When the mixture is made in proportions of twenty-five parts of gum, five parts of sulphur, and seven parts of white lead, the temperature of 270° will be usually found the best, and the duration of the process will vary, according to the thicknesses of the mass, from two to six hours, the thinner mass requiring the least time. The same effect may also be produced by using heated cylinders and passing the material in sheets slowly over their surfaces, and in various other ways or methods, which the convenience of the operator may suggest. The heat may be communicated from the place of combustion to the place where the rubber is to be operated on, the only object being to subject the material to the influence of heat for a sufficient time to produce the desired result.

In subjecting the india-rubber to heat, for the purposes described, sulphur may be used or incorporated with or applied to the caoutchouc in a variety of ways, either in a gaseous, liquid, or solid form; but its presence in some form at some time during the application of the heat is essential to the production of the new manufacture which CHARLES GOODYEAR invented, although it is found that this effect will be produced by the of the very small quantities of sulphur. In practice, however, for most purposes the proportions mentioned in this description will be found sufficiently accurate for good results.

Before the plastic india-rubber (prepared as before mentioned) is subjected to the above-described process it may be molded or formed into any desired shape, and in that shape operated upon; and other materials—such as cotton, silk, wool, or leather—may be incorporated or combined with the india-rubber and sulphur, thereby modifying the strength, elasticity, or other qualities of the new manufacture for particular purposes, as it is found that the new substance or product will be produced whenever the essential elements of rubber, sulphur, and heat are used, whether such other materials are incorporated or not.

What is claimed as the invention of CHARLES GOODYEAR, deceased, is—

Subjecting caoutchouc or india-rubber or other vulcanizable gums mixed with or in the presence of sulphur (whether with or without other ingredients) to the action of heat, for the purpose of affecting its qualities or properties, as described.

CHAS. GOODYEAR.

In presence of—
EDW. N. DICKERSON,
JAMES A. DORR.